United States Patent
Gao et al.

(10) Patent No.: US 12,002,932 B2
(45) Date of Patent: Jun. 4, 2024

(54) SURFACE REFORMING OF NEGATIVE ELECTRODE LAYERS

(71) Applicant: GM GLOBAL TECHNOLOGY OPERATIONS LLC, Detroit, MI (US)

(72) Inventors: Jing Gao, Rochester, MI (US); Xingcheng Xiao, Troy, MI (US); Brian J. Koch, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

(21) Appl. No.: 17/353,027

(22) Filed: Jun. 21, 2021

(65) Prior Publication Data
US 2022/0407126 A1    Dec. 22, 2022

(51) Int. Cl.
*H01M 10/44* (2006.01)
*H01M 10/0525* (2010.01)
*H01M 10/48* (2006.01)

(52) U.S. Cl.
CPC ....... *H01M 10/44* (2013.01); *H01M 10/0525* (2013.01); *H01M 10/48* (2013.01)

(58) Field of Classification Search
CPC ... H01M 10/44; H01M 10/0525; H01M 10/48
See application file for complete search history.

(56) References Cited

U.S. PATENT DOCUMENTS

| | | | | |
|---|---|---|---|---|
| 4,616,170 | A | * 10/1986 | Urstoger | H02J 7/0019 320/124 |
| 2020/0076010 | A1* | 3/2020 | Taylor | H01M 10/44 |
| 2022/0238932 | A1 | 7/2022 | Gao et al. | |
| 2022/0255151 | A1* | 8/2022 | Kim | G01R 31/3865 |

FOREIGN PATENT DOCUMENTS

| | | |
|---|---|---|
| CN | 115579531 A | 1/2023 |
| DE | 102022109564 A1 | 12/2022 |

OTHER PUBLICATIONS

Jing Gao et al., "Electrochemical Cell Monitoring Assembly", U.S. Appl. No. 17/160,553, filed Jan. 28, 2021.

* cited by examiner

*Primary Examiner* — Brian R Ohara
*Assistant Examiner* — Patrick Marshall Greene
(74) *Attorney, Agent, or Firm* — Harness, Dickey & Pierce, P.L.C.

(57) ABSTRACT

A method of reforming a negative electrode layer of a secondary lithium battery may include execution of a reforming cycle that reforms a major facing surface of the negative electrode layer by eliminating at least a portion of a lithium dendrite or other lithium-containing surface irregularity that has formed on the major facing surface of the negative electrode layer.

14 Claims, 1 Drawing Sheet

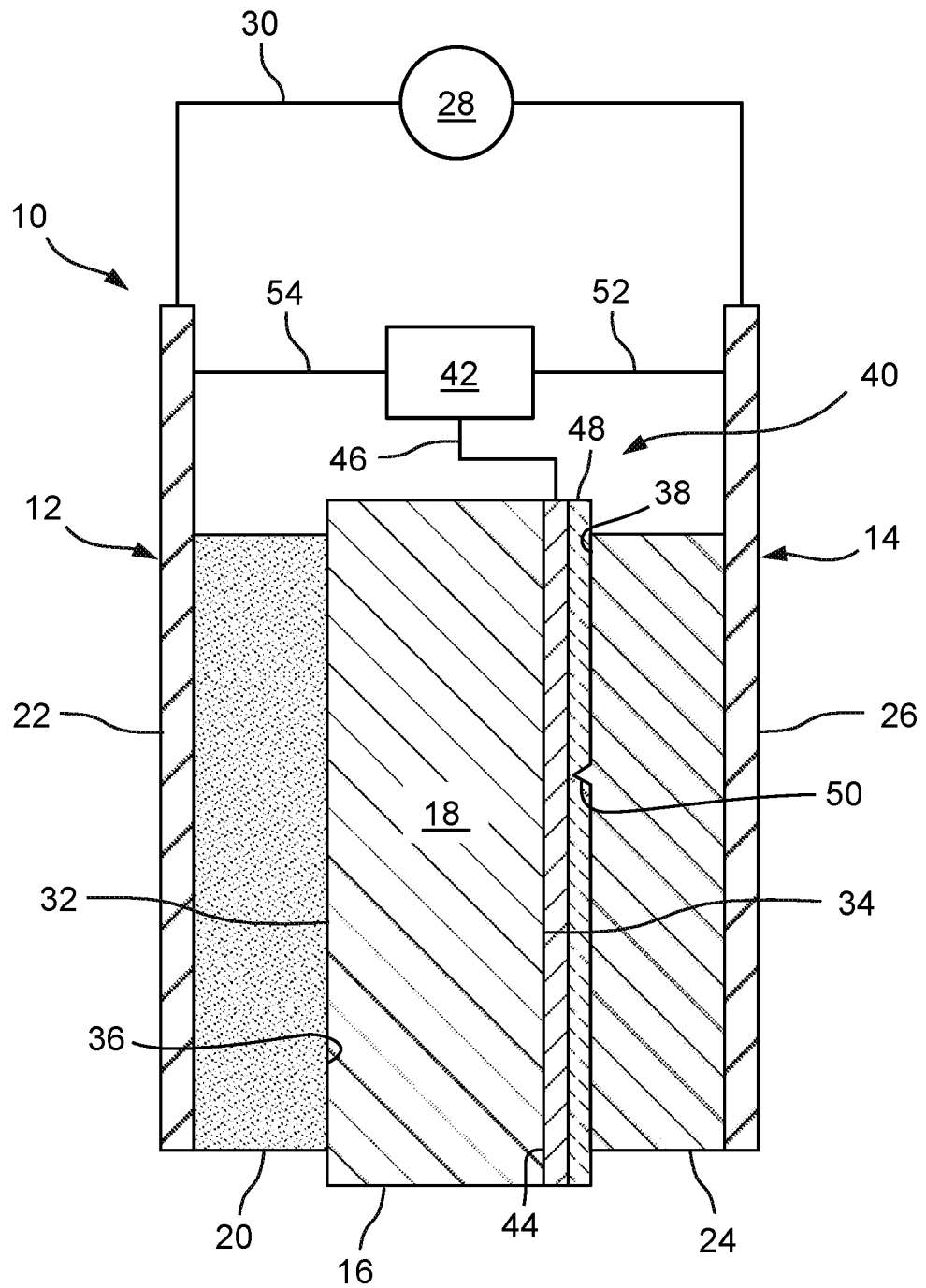

SURFACE REFORMING OF NEGATIVE ELECTRODE LAYERS

INTRODUCTION

The present disclosure relates to negative electrodes and, more particularly, to systems and methods of reforming surfaces of negative electrode layers of secondary lithium batteries.

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium batteries generally comprise one or more electrochemical cells that operate by reversibly passing lithium ions between a negative electrode and a positive electrode. The negative and positive electrodes are oftentimes disposed on opposite sides of a porous polymeric separator, and each of the negative and positive electrodes is typically carried on, or connected to, a metallic current collector. The negative and positive electrodes and the polymeric separator are infiltrated with an ionically conductive electrolyte that provides a medium for the conduction of lithium ions through the electrochemical cell between the negative and positive electrodes. In practice, an electrochemical potential is established between the negative and positive electrodes of the electrochemical cell by connecting their respective current collectors to one another via a controllable and interruptible external circuit.

During discharge of the electrochemical cell, the electrochemical potential established between the negative and positive electrodes drives spontaneous redox reactions within the electrochemical cell and the release of lithium ions and electrons at the negative electrode. The released lithium ions travel from the negative electrode to the positive electrode through the ionically conductive electrolyte, and the electrons travel from the negative electrode to the positive electrode via the external circuit, which generates an electric current. After the negative electrode has been partially or fully depleted of lithium, the electrochemical cell may be recharged by connecting the negative and positive electrodes to an external power source, which drives nonspontaneous redox reactions within the electrochemical cell and the release of the lithium ions and the electrons from the positive electrode. During recharge of lithium-ion batteries, the released lithium ions return to the negative electrode and may be inserted or intercalated between lattice structures of the negative electrode material, or the lithium ions may react (e.g., alloy) with the negative electrode material to form lithium-containing intermetallic phases. In secondary lithium metal batteries, the released lithium ions are reduced to lithium metal and plated on a surface of the negative electrode current collector in the form of a substantially uniform lithium metal layer.

After repeated charging cycles, mossy or branched lithium metal structures (oftentimes referred to as lithium dendrites) may undesirably form at the interface between the electrolyte and a surface of the negative electrode. In addition, in secondary lithium metal batteries, the physical structure of the lithium metal layer may develop undesirable surface irregularities. It may be desirable to determine when lithium dendrites or other surface irregularities have formed on a surface of the negative electrode and to develop a protocol that can be used to restore the negative electrode to its original condition.

SUMMARY

A method of reforming a negative electrode layer of a secondary lithium battery is disclosed. In the method, an electrical parameter is measured. The electrical parameter is associated with a porous sensory layer disposed between a major facing surface of the negative electrode layer and an opposing surface of a positive electrode layer of an electrochemical cell. The porous sensory layer includes an electrically conductive material. The electrical parameter is evaluated to determine whether a lithium dendrite is present on the major facing surface of the negative electrode layer that extends continuously from the major facing surface of the negative electrode layer to the porous sensory layer. Responsive to a positive determination that the lithium dendrite is present on the major facing surface of the negative electrode layer, a reforming cycle is executed. The reforming cycle reforms the major facing surface of the negative electrode layer and eliminates at least a portion of the lithium dendrite such that the lithium dendrite does not extend continuously from the major facing surface of the negative electrode layer to the porous sensory layer.

The electrical parameter may be at least one of: (i) an electrical potential difference between the porous sensory layer and the negative electrode layer, or (ii) an electric current flowing through the porous sensory layer. In such case, the reforming cycle may be executed when a measurement of the electrical potential difference between the porous sensory layer and the negative electrode layer is about zero or when a measurement of the electric current flowing through the porous sensory layer is greater than zero.

The reforming cycle may be executed by at least one of: (i) passing a pulsed electric current between the negative electrode and the porous sensory layer and through the lithium dendrite, or (ii) applying a voltage pulse across the negative electrode and the porous sensory layer such that electric current flows through the lithium dendrite. In such case, execution of the reforming cycle may generate heat within the lithium dendrite.

The reforming cycle may be executed by applying a discharge current to the negative electrode layer that at least partially discharges the electrochemical cell. The discharge current applied to the negative electrode layer may exhibit a pulsed current profile that includes at least two current pulses separate in time.

In the method, a number of charge and discharge cycles experienced by the electrochemical cell may be recorded. In such case, the reforming cycle may be executed when the number of charge and discharge cycles experienced by the electrochemical cell is greater than a predetermined number of charge and discharge cycles.

The negative electrode layer may consist essentially of lithium metal and may comprise, by weight, greater than 97% lithium, or the negative electrode layer may comprise an electrochemically active host material of graphite or silicon.

A method of reforming a negative electrode layer of a secondary lithium battery is disclosed. In the method, an electrochemical cell is cycled. The electrochemical cell includes the negative electrode layer, a positive electrode layer, and a porous separator disposed between a major facing surface of the negative electrode layer and an opposing surface of the positive electrode layer. Cycling of the electrochemical cell includes repeatedly charging and discharging the electrochemical cell by respectively applying a charging current to the positive electrode layer and a first discharge current to the negative electrode layer. An electrical parameter is measured that is associated with the electrochemical cell. The electrical parameter is evaluated to determine whether to execute a reforming cycle. Based upon evaluation of the electrical parameter, the reforming cycle is executed to reform the major facing surface of the negative electrode layer. Cycling the electrochemical cell forms lithium dendrites or lithium-containing surface irregularities on the major facing surface of the negative electrode layer. Execution of the reforming cycle eliminates at least a portion of the lithium dendrites or the lithium-containing surface irregularities on the major facing surface of the negative electrode.

The electrical parameter may be at least one of: (i) a number of charging and discharge cycles of the electrochemical cell, (ii) a measured electrical resistance of the electrochemical cell, or (iii) a measured electric potential difference between the negative electrode layer and the positive electrode layer.

In the method, the reforming cycle may be executed when: (i) the number of charging and discharge cycles is greater than a predetermined number, (ii) the measured electrical resistance is greater than a predetermined electrical resistance value, or (iii) the measured electrical potential difference is less than a predetermined electrical potential difference value.

Execution of the reforming cycle may include applying a second discharge current to the negative electrode layer to at least partially discharge the electrochemical cell. The second discharge current may be greater than the first discharge current. The second discharge current may exhibit a pulsed current profile that includes at least two current pulses separate in time.

A system for reforming a negative electrode layer of a secondary lithium battery is disclosed. In the system, a porous sensory layer is disposed between a major facing surface of the negative electrode layer and an opposing surface of a positive electrode layer of an electrochemical cell. The porous sensory layer includes an electrically conductive material. A microcontroller is electrically coupled to the porous sensory layer and the negative electrode layer. The microcontroller is configured to: (i) measure an electrical parameter associated with the porous sensory layer, (ii) evaluate the electrical parameter to determine whether a lithium dendrite is present on the major facing surface of the negative electrode layer that extends continuously from the major facing surface of the negative electrode layer to the porous sensory layer, and (iii) responsive to a positive determination that the lithium dendrite is present on the major facing surface of the negative electrode, to execute a reforming cycle that reforms the major facing surface of the lithium metal negative electrode layer and eliminates at least a portion of the lithium dendrite such that the lithium dendrite does not extend continuously from the major facing surface of the negative electrode layer to the porous sensory layer.

The electrical parameter may be an electrical potential difference between the porous sensory layer and the negative electrode layer. The electrical potential difference may be measured by a voltmeter of the microcontroller.

The electrical parameter may be an electric current flowing through the porous sensory layer. The electric current may be measured by an ammeter of the microcontroller.

The microcontroller may include memory. In such case, the microcontroller may be configured to evaluate the electrical parameter by comparing the electrical parameter to predetermined values in a lookup table stored in the memory of the microcontroller.

The system may include a nonaqueous electrolyte in ionic contact with the porous sensory layer, the negative electrode layer, and the positive electrode layer. A porous separator may be disposed between the negative electrode layer and the positive electrode layer. The porous separator may be infiltrated with the nonaqueous electrolyte.

The negative electrode layer may consist essentially of lithium metal and may comprise, by weight, greater than 97% lithium, or the negative electrode layer may comprise an electrochemically active host material of graphite or silicon.

The electrochemical cell may be hermetically sealed within a housing. In such case, the microcontroller may be physically incorporated into the housing of the electrochemical cell.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein:

FIG. 1 is a schematic side cross-sectional view of an electrochemical cell of a secondary lithium battery including a system for reforming a surface of a negative electrode layer of the electrochemical cell, the system including a porous sensory layer disposed between the negative electrode layer and an opposing positive electrode layer and a controller electrically coupled to the porous sensory layer and the negative electrode layer.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed systems and methods may be used to reform surfaces of negative electrode layers of electrochemical cells of secondary lithium batteries, for example, by restoring uniformity and a substantially smooth contour to the surfaces of the negative electrode layers. During repeated charging and discharge cycles of the electrochemical cells, lithium dendrites and/or other surface irregularities may form on surfaces of the negative electrode layers, and the presently disclosed systems and methods may be used to eliminate or smooth over at least a portion of the lithium dendrites and/or surface irregularities.

FIG. 1 depicts a schematic side cross-sectional view of an electrochemical cell 10 that may be combined with one or more additional electrochemical cells to form a secondary lithium metal battery. The electrochemical cell 10 includes a positive electrode 12, a negative electrode 14 spaced-apart from the positive electrode 12, a porous separator 16 that physically and electrically isolates the positive and negative electrodes 12, 14 from each other, and a nonaqueous electrolyte 18 that infiltrates the pores of the porous separator 16 and provides an ionically conductive pathway for the transfer of lithium ions between the positive electrode 12 and the negative electrode 14 within the electrochemical cell 10. The positive electrode 12 includes a positive electrode layer 20 disposed on a major surface of a positive electrode current collector 22, and the negative electrode 14 includes a negative electrode layer 24 disposed on an opposing major surface of a negative electrode current collector 26. In practice, the positive and negative electrode current collectors 22, 26 may be electrically coupled to a power source or load 28 via an external circuit 30.

The porous separator 16 electrically isolates the positive electrode 12 and the negative electrode 14 from one another and includes a first major surface 32 that faces toward the positive electrode 12 and an opposite second major surface 34 that faces toward the negative electrode 14. The porous separator 16 exhibits an open microporous structure and may comprise an organic and/or inorganic material that can physically separate and electrically insulate the negative electrode layer 24 from the positive electrode layer 20, while permitting the free flow of ions therebetween. The porous separator 16 may comprise a non-woven material, e.g., a manufactured sheet, web, or matt of directionally or randomly oriented fibers. The porous separator 16 may comprise a microporous polymeric material, e.g., a microporous polyolefin-based membrane or film. For example, the porous separator 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 16 may comprise a laminate of one or more polymeric materials, such as a laminate of PE and PP. The porous separator 16 may have a thickness in the range of 5 μm to 30 μm and a porosity in a range of 25% to 75%.

In assembly, the positive electrode layer 20, the negative electrode layer 24, and the porous separator 16 are infiltrated with the nonaqueous electrolyte 18. The nonaqueous electrolyte 18 provides an ionically conductive pathway through the electrochemical cell 10 between the positive electrode layer 20 and the negative electrode layer 24. As such, the nonaqueous electrolyte 18 may comprise a material that can effectively conduct lithium ions through the porous separator 16 and between the positive electrode layer 20 and the negative electrode layer 24 during operation of the electrochemical cell 10. For example, the nonaqueous electrolyte 18 may comprise a liquid electrolyte solution including a lithium salt dissolved or ionized in a nonaqueous, aprotic organic solvent or a mixture of nonaqueous, aprotic organic solvents. Lithium salts that may be used to make the electrolyte include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and combinations thereof. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethyl methyl carbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a combination thereof. As another example, the nonaqueous electrolyte 18 may comprise a gel or plasticized polymer electrolyte. In such case, the nonaqueous electrolyte 18 may comprise a polymer host material soaked with a nonaqueous liquid electrolyte solution. Examples of polymer host materials include poly(vinylidene) (PVdF), poly(acrylonitrile) (PAN), poly(methyl methacrylate) (PMMA), poly(ethylene oxide) (PEO), polyacrylates, and poly(vinylidene fluoride-hexafluoropropylene) (PVdF-HFP).

The positive electrode layer 20 is disposed on the positive electrode current collector 22 and includes a major surface 36 that faces toward the porous separator 16 and toward the negative electrode 14. The positive electrode layer 20 may comprise one or more electrochemically active materials that can undergo a reversible redox reaction with lithium, e.g., a material that can sufficiently undergo lithium intercalation and deintercalation, alloying and dealloying, or plating and stripping. The electrochemically active material of the positive electrode layer 20 may be intermingled with a polymeric binder to provide the positive electrode layer 20 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode layer 20 optionally may include particles of an electrically conductive material, which may comprise very fine particles of, for example, high-surface area carbon black. The electrochemically active material(s) may account for, by weight, from 50% to 90% of the positive electrode layer 20, the polymeric binder may account for, by weight, from 5% to 30% of the positive electrode layer 20, and the electrically conductive material may account for, by weight, 5% to 40% of the positive electrode layer 20.

The negative electrode layer 24 is disposed on the negative electrode current collector 26 and includes a major facing surface 38 that faces toward the porous separator 16 and toward the positive electrode 12. The negative electrode layer 24 may have a thickness in a range of from 5 micrometers to 600 micrometers.

In aspects, the negative electrode layer 24 may comprise an electrochemically active host material that can undergo a reversible redox reaction with lithium during operation of the electrochemical cell 10. For example, the negative electrode layer 24 may comprise a material that can undergo the reversible insertion or intercalation of lithium ions or that can react with lithium to form a lithium-containing intermetallic compound. Examples of electrochemically active host materials for the negative electrode layer 24 include carbon-based materials (e.g., graphite, activated carbon, carbon black, and/or graphene), silicon, silicon-based alloys and/or composite materials, tin oxide, aluminum, indium, zinc, germanium, silicon oxide, titanium oxide, and/or lithium titanate. In embodiments where the negative electrode layer 24 comprises an electrochemically active host material, the host material may be intermingled with a polymeric binder to provide the negative electrode layer 24 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The negative electrode layer 24 optionally may include particles of an electrically conductive material, which may comprise very fine particles of, for example, high-surface area carbon black.

In other aspects, the negative electrode layer 24 may comprise of a layer of lithium metal. For example, the negative electrode layer 24 may comprise a lithium metal alloy or may consist essentially of lithium (Li) metal. In either case, the negative electrode layer 24 may comprise, by weight, greater than 97% lithium or, more preferably, greater than 99% lithium.

The positive and negative electrode current collectors 22, 26 each may comprise a material (e.g., a metallic material) that can collect and reversibly passing free electrons to and from their respective electrode layers 20, 24. The positive and negative electrode current collectors 22, 26 each may be in the form of thin and flexible porous or non-porous electrically conductive metallic substrates. The term "metallic," as used herein refers to a material that predominantly comprises one or more metals. As such, a metallic material may comprise a single metal, more than one metal (in alloy form or otherwise), or both one or more metals and one or more other non-metal components in elemental or compound form. For example, the positive and negative electrode current collectors 22, 26 may comprise an electrically conductive metal or metal alloy, e.g., a transition metal or an alloy thereof. In aspects, the positive electrode current collector 22 may comprise aluminum (Al), nickel (Ni), or an iron (Fe) alloy (e.g., stainless steel) and the negative electrode current collector 26 may comprise copper (Cu), nickel (Ni), an iron (Fe) alloy (e.g., stainless steel), or titanium (Ti). Other electrically conductive metallic materials may of course be used, if desired.

A system 40 for reforming the major facing surface 38 of the negative electrode layer 24 is associated with the electrochemical cell 10 and at least partially incorporated into the physical structure of the electrochemical cell 10. The system 40 includes an electronic control unit or microcontroller 42 and a porous sensory layer 44 disposed between the major facing surface 38 of the negative electrode layer 24 and the opposing surface 36 of the positive electrode layer 20. The porous sensory layer 44 is electrically coupled to the microcontroller 42, for example, by a first electrical connector 46. The negative electrode layer 24 is electrically coupled to the microcontroller 42, for example, by a second electrical connector 52. The second electrical connector 52 may be in the form of a physical and electrical connection between the negative electrode current collector 26 and the microcontroller 42. The positive electrode layer 20 may be electrically coupled to the microcontroller 42, for example, by a third electrical connector 54. The third electrical connector 54 may be in the form of a physical and electrical connection between the positive electrode current collector 22 and the microcontroller 42.

The porous sensory layer 44 is configured to provide the microcontroller 42 with information that can be interpreted by the microcontroller 42 to diagnose certain conditions within the electrochemical cell 10, without interfering with the operation of the electrochemical cell 10, specifically, without inhibiting the free flow of ions between the positive electrode layer 20 and the negative electrode layer 24. The porous sensory layer 44 includes at least one electrically conductive material and may extend in a substantially continuous layer between the porous separator 16 and the major facing surface 38 of the negative electrode layer 24. In aspects, the porous sensory layer 44 may be commensurate in size with the area of the facing surface 38 of the negative electrode layer 24. In the porous sensory layer 44, the at least one electrically conductive material may be combined with one or more additional materials that may assist, for example, in deposition or adhesion of the porous sensory layer 44 on the major surface 34 of the porous separator 16. The electrically conductive material of the porous sensory layer 44 may comprise or consist essentially of at least one of nickel, copper, titanium, silver, gold, carbon, or aluminum. In practice, the pores of the porous sensory layer 44 may be infiltrated with the nonaqueous electrolyte 18. The electrically conductive material may account for, by weight, from 50% to 100% of the porous sensory layer 44 and, more preferably, of greater than 90% of the porous sensory layer 44, without accounting for the weight of the nonaqueous electrolyte 18 in the pores of the porous sensory layer 44. The porous sensory layer 44 may have a thickness in a range of from 10 nanometers to 1 micrometer, or more preferably in a range of from 25 nanometers to 200 nanometers. The thickness and density of the porous sensory layer 44 may be selected so that the porous sensory layer 44 is thick enough and dense enough to form at least one continuous electrically conductive pathway therethrough, without inhibiting the free flow of lithium ions.

The porous sensory layer 44 is electrically isolated from the positive electrode layer 20 and from the negative electrode layer 24. In aspects, the porous sensory layer 44 may be electrically isolated from the positive electrode layer 20 and the negative electrode layer 24 by being incorporated into the structure of the porous separator 16. In other aspects, the porous sensory layer 44 may be disposed between the porous separator 16 and the major facing surface 38 of the negative electrode layer 24, for example, by being disposed on the major surface 34 of the porous separator 16 adjacent the negative electrode layer 24. In such case, a buffer layer 48 may be disposed on the major surface 34 of the porous separator 16 over the porous sensory layer 44, and the buffer layer 48 may electrically isolate the porous sensory layer 44 from the major facing surface 38 of the negative electrode layer 24 during operation of the electrochemical cell 10.

When included in the electrochemical cell 10, the buffer layer 48 is porous and is configured to electrically isolate the porous sensory layer 44 from the major facing surface 38 of the negative electrode layer 24 without inhibiting the free flow of lithium ions therethrough. The buffer layer 48 may comprise or consist essentially of at least one electrically insulating material. In aspects, the electrically insulating material of the buffer layer 48 may comprise at least one of an electrically insulating ceramic material (e.g., $Al_2O_3$, $SiO_2$, $ZrO_2$, $TiO_2$, $ZnO$, $Ta_2O_5$, $La_2O_5$, HfO, lithium-lanthanum-zirconium oxide (Li—La—Zr—O), or a zeolite), an electrically insulating polymeric material (e.g., polytetrafluoroethylene), an electrically insulating composite material (e.g., aluminum alkoxide, zirconium alkoxide, titanium alkoxide), and/or diamond-like carbon. In the buffer layer 48, the electrically insulating material may be combined with one or more additional materials that may assist, for example, in deposition or adhesion of the buffer layer 48 on the major surface 34 of the porous separator 16 over porous sensory layer 44. In aspects, the electrically insulating material of the buffer layer 48 may be made of the same material as that of the porous separator 16. In practice, the pores of the buffer layer 48 may be infiltrated with the nonaqueous electrolyte 18. The electrically insulating material may account for, by weight, from 50% to 100% of the buffer layer 48, preferably greater than 90% of the buffer layer 48, without accounting for the weight of the nonaqueous electrolyte 18 in the pores of the buffer layer 48.

The microcontroller 42 is configured to operate in at least two modes: a monitoring mode and a reforming mode. During the monitoring mode, the microcontroller 42 continuously, periodically, or intermittently measures or monitors electrical parameters associated with the electrochemical cell 10 and evaluates the electrical parameters to determine whether to switch to the reforming mode and to execute a reforming cycle. The reforming cycle executed by microcontroller 42 during the reforming mode effectively reforms the major facing surface 38 of the negative electrode layer 24 by restoring uniformity and a substantially smooth contour to the major facing surface 38 of the negative electrode layer 24. During repeated cycling (charging and discharging) of the electrochemical cell 10, one or more lithium dendrites 50 or other surface irregularities may form on the major facing surface 38 of the negative electrode layer 24. In response to formation of a lithium dendrite 50 or other surface irregularity on the major facing surface 38 of the negative electrode layer 24, the microcontroller 42 may execute the reforming cycle to effectively eliminate or reduce the size of the lithium dendrite 50 or of the surface irregularity.

The microcontroller 42 may be in the form of an integrated circuit including a central processing unit (CPU), memory (non-volatile memory and read-write memory), and one or more input/output (I/O) peripheral devices (not shown). The I/O peripheral devices of the microcontroller 42 are configured to sense or measure one or more electrical parameters associated with the electrochemical cell 10 when the microcontroller 42 is operating in the monitoring mode and to carry-out the tasks of the reforming cycle when the microcontroller 42 is operating in the reforming mode. For example, the microcontroller 42 may include one or more sensors, e.g., voltage sensors (voltmeters), current sensors (ammeters), and/or ohmmeters. The microcontroller 42 may include one or more electrical switches that can be used to control the flow of electric current in one or more electric circuits associated with the electrochemical cell 10. The microcontroller 42 may be associated with the electrochemical cell 10, for example, by being physically incorporated into (hermetically sealed within) a housing or case (not shown) for the electrochemical cell 10. In other embodiments, the microcontroller 42 may be part of an external control device (not shown) associated with the lithium metal battery or another host. Power for operation of the microcontroller 42 may be sourced from the electrochemical cell 10 itself or from another power source, if desired.

When the microcontroller is operating in the monitoring mode, the microcontroller 42 may measure (and/or record) and evaluate one or more electrical parameters associated with the electrochemical cell 10.

In aspects, when the microcontroller 42 is operating in the monitoring mode, the microcontroller 42 may measure and evaluate one or more electrical parameters associated with the electrochemical cell 10 to determine whether a lithium dendrite 50 has formed on the major facing surface 38 of the negative electrode layer 24 that extends continuously from the major facing surface 38 of the negative electrode layer 24 to the porous sensory layer 44. The microcontroller 42 may switch to operation in the reforming mode when a positive determination is made regarding formation of the lithium dendrite 50. For example, the microcontroller 42 may measure an electrical potential difference between the porous sensory layer 44 and the negative electrode layer 24 (e.g., via the first and second electrical connectors 46, 52) may evaluate the measured electrical potential difference to determine whether a lithium dendrite 50 has formed on the major facing surface 38 of the negative electrode layer 24 that extends continuously from the major facing surface 38 of the negative electrode layer 24 to the porous sensory layer 44. If the measured electrical potential difference between the porous sensory layer 44 and the negative electrode layer 24 is a positive numeric value (i.e., >0), the microcontroller 42 may determine that no lithium dendrite 50 is present and may continue to operate in the monitoring mode. If the measured electrical potential difference between the porous sensory layer 44 and the negative electrode layer 24 is about zero (0), the microcontroller 42 may positively determine that a lithium dendrite 50 is present on the major facing surface 38 of the negative electrode layer 24 that extends continuously from the major facing surface 38 of the negative electrode layer 24 to the porous sensory layer 44. In such case, the microcontroller 42 may switch to operation in the reforming mode and may execute the reforming cycle.

As another example, the microcontroller 42 may measure an electric current flowing through the porous sensory layer 44 (e.g., via the first electrical connector 46). The microcontroller 42 may evaluate the measured electric current to determine whether a lithium dendrite 50 has formed on the major facing surface 38 of the negative electrode layer 24 that extends continuously from the major facing surface 38 of the negative electrode layer 24 to the porous sensory layer 44. The formation of a lithium dendrite 50 on the major facing surface 38 of the negative electrode layer 24 that extends continuously from the major facing surface 38 of the negative electrode layer 24 to the porous sensory layer 44 will effectively complete an electric circuit between the negative electrode layer 24 to the porous sensory layer 44, and thus may provide a pathway for current to flow through the porous sensory layer 44. Therefore, if the measured electric current flowing through the porous sensory layer 44 is about zero (0), the microcontroller 42 may determine that no lithium dendrite 50 is present and may continue to operate in the monitoring mode. Alternatively, if the measured electric current flowing through the porous sensory layer 44 is a positive numeric value (i.e., >0), the microcontroller 42 may positively determine that a lithium dendrite 50 is present on the major facing surface 38 of the negative electrode layer 24 that extends continuously from the major facing surface 38 of the negative electrode layer 24 to the porous sensory layer 44. In such case, the microcontroller 42 may switch to operation in the reforming mode and may execute the reforming cycle.

In other aspects, when the microcontroller 42 is operating in the monitoring mode, the microcontroller 42 may measure (and/or record) and evaluate one or more electrical parameters associated with the electrochemical cell 10 to determine whether to switch to operation in the reforming mode, without regard to the absence or presence of a lithium dendrite 50 on the major facing surface 38 of the negative electrode layer 24. For example, the microcontroller 42 may keep a record of the number of charge and discharge cycles experienced by the electrochemical cell 10 and may switch to operation in the reforming mode if the recorded number of charge and discharge cycles is greater than or equal to a predetermined number of charge and discharge cycles, which may be stored in memory of the microcontroller 42 for comparison. As another example, the microcontroller 42 may measure an electrical resistance of the electrochemical cell 10 and/or measure an electric potential difference between the negative electrode layer 24 and the positive electrode layer 20 (e.g., via the second and third electrical connectors 52, 54) and may switch to operation in the reforming mode if the microcontroller 42 positively determines that the measured electrical resistance of the electrochemical cell 10 is greater than a predetermined electrical resistance value, and/or the measured electric potential difference between the negative electrode layer 24 and the positive electrode layer 20 is less than a predetermined electrical potential difference value. The recorded number of charge and discharge cycles and/or the measured values of the electrical resistance and/or electric potential difference that may cause the microcontroller 42 to switch to operation in the reforming mode may be predetermined in a laboratory environment during calibration of the electrochemical cell 10 and may be stored in the memory of the microcontroller 42 for comparison. Other electrical parameters that may be measured and evaluated by the microcontroller 42 to determine whether to switch to operation in the reforming mode may include the open circuit voltage of the electrochemical cell 10 and/or the rate at which the open circuit voltage of the electrochemical cell 10 decays to an equilibrium voltage, as well as identification by the microcontroller 42 of any inconsistencies or inflections in the measured electrochemical potential of the electrochemical cell 10. Such electrical parameters may be evaluated by the microcontroller 42 by comparison to data stored in the memory of the microcontroller 42.

The reforming cycle is executed by the microcontroller 42 upon switching to operation in the reforming mode. During the reforming cycle, uniformity and a substantially smooth contour are restored to the major facing surface 38 of the negative electrode layer 24. For example, the reforming cycle may effectively eliminate at least a portion of the lithium dendrites 50 or surface irregularities that have formed on the major facing surface 38 of the negative electrode layer 24. In aspects, the reforming cycle may eliminate or reduce the size of the lithium dendrites 50 or surface irregularities, even if the lithium dendrites 50 or surface irregularities have not yet grown far enough away from the negative electrode layer 24 and made physical contact with the porous sensory layer 44.

In aspects where at least one lithium dendrite 50 has formed on the major facing surface 38 of the negative electrode layer 24 that extends continuously from the major facing surface 38 of the negative electrode layer 24 to the porous sensory layer 44, execution of the reforming cycle may include: (i) passing an electric current between the negative electrode layer 24 and the porous sensory layer 44 and through the lithium dendrite 50 (e.g., via the first and second electrical connectors 46, 52), or (ii) applying an electric potential difference across the negative electrode layer 24 and the porous sensory layer 44 (e.g., via the first and second electrical connectors 46, 52) such that electric current flows through the lithium dendrite 50. Without intending to be bound by theory, it is believed passing an electric current through the lithium dendrite 50 at a relatively high current density may effectively reform the major facing surface 38 of the negative electrode layer 24 by generating heat within the lithium dendrite 50, thereby causing lithium in the lithium dendrite 50 to melt and/or dissolve or dissociate into the surrounding nonaqueous electrolyte 18.

The magnitude of the electric current passed between the negative electrode layer 24 and the porous sensory layer 44 (and through the lithium dendrite 50) during the reforming cycle may be relatively small, e.g., as compared to the electric current flowing between the positive and negative electrode layers 20, 24 during operation of the electrochemical cell 10 and/or through the lithium dendrite 50 during normal operation of the electrochemical cell 10. However, due to the inherently small diameter of the lithium dendrite 50, the electric current locally passed through the lithium dendrite 50 during the reforming cycle may exhibit a relatively high current density (as compared to the current density flowing through the negative electrode layer 24 and the porous sensory layer 44 at the same time). The magnitude of the electric current passed between the negative electrode layer 24 and the porous sensory layer 44 (and through the lithium dendrite 50) during the reforming cycle may be selected so that the resulting current density in the lithium dendrite 50 is in a range of from one microampere per square centimeter ($\mu A/cm^2$) to one milliampere per square centimeter ($mA/cm^2$). In aspects, the electric current passed between the negative electrode layer 24 and the porous sensory layer 44 (and through the lithium dendrite 50) during execution of the reforming cycle may be in the form of a pulsed electric current. The electric current may exhibit a pulsed current profile including one or more electric current pulses, with each electric current pulse having a duration in a range of from one second to 200 seconds. The number and duration of electric current pulses applied during the reforming cycle may be based upon the value of the measured, recorded, and/or evaluated electrical parameters associated with the electrochemical cell 10 and may be predetermined in a laboratory environment during calibration of the electrochemical cell 10 and stored in the memory of the microcontroller 42.

The electric potential difference applied across the negative electrode layer 24 and the porous sensory layer 44 during execution of the reforming cycle may be based upon the electrically conductive material of the porous sensory layer 44. For example, the electric potential difference applied across the negative electrode layer 24 and the porous sensory layer 44 during the reforming cycle may be selected to match the equilibrium potential of the electrically conductive material of the porous sensory layer 44. In aspects, the electric potential difference applied across the negative electrode layer 24 and the porous sensory layer 44 during the reforming cycle may be in the form of a voltage pulse. The voltage pulse may exhibit a pulsed voltage profile including one or more voltage pulses, with each voltage pulse having a duration in a range of from one second to 200 seconds. The number and duration of voltage pulses applied during the reforming cycle may be based upon the value of the measured, recorded, and/or evaluated electrical parameters associated with the electrochemical cell 10 and may be predetermined in a laboratory environment during calibration of the electrochemical cell 10 and stored in the memory of the microcontroller 42.

When no lithium dendrites 50 have formed on the major facing surface 38 of the negative electrode layer 24 that extend continuously from the major facing surface 38 of the negative electrode layer 24 to the porous sensory layer 44, execution of the reforming cycle may include applying a discharge current to the electrochemical cell 10 (e.g., to the negative electrode layer 24) to at least partially discharge the electrochemical cell 10. Without intending to be bound by theory, it is believed that applying a discharge current to the electrochemical cell 10 at a relatively high C-rate or at a relatively high current density may effectively reform the major facing surface 38 of the negative electrode layer 24 by preferentially stripping lithium metal from portions of the one or more lithium dendrites 50 or surface irregularities that extend the greatest distance away from the major facing surface 38 of the negative electrode layer 24 (or from the negative electrode current collector 26).

The discharge current applied to the electrochemical cell 10 during execution of the reforming cycle may be in the form of a continuous or pulsed discharge current having a relatively high C-rate or current density (i.e., higher than the C-rate or current density that would typically occur during discharge of the electrochemical cell 10). For example, the discharge current applied to the electrochemical cell 10 may be equivalent to a C-rate in a range of from 1 C to 10 C and/or may exhibit a current density in a range of from 4 mA/cm$^2$ to 40 mA/cm$^2$. In aspects, the discharge current may be applied to the electrochemical cell 10 for a duration sufficient for the electrochemical cell 10 to reach a state of charge (SOC) of less than 3% or to achieve full discharge of the electrochemical cell 10 (0% SOC). In aspects, the electrical potential difference between the porous sensory layer 44 and the negative electrode layer 24 (or the electric current flowing through the porous sensory layer 44) may be continuously or intermittently measured by the microcontroller 42 during the reforming cycle. In such case, the discharge current may be applied to the electrochemical cell 10 until the measured electrical potential difference is a positive numeric value (i.e., >0) and/or the measured electric current is about zero (0).

The discharge current applied to the electrochemical cell 10 may exhibit a constant current profile or a pulsed current profile including at least two current pulses. In aspects where the discharge current exhibits a constant current profile, the discharge current may be continuously applied to the electrochemical cell 10 and the current density of the discharge current may be constant or may be gradually increased over time. In aspects where the discharge current exhibits a pulsed current profile, the at least two discharge current pulses may be applied consecutively. In other aspects, a charging current may be applied to the electrochemical cell 10 between the at least two discharge current pulses. The microcontroller 42 may determine whether to apply an intermediate charging current to the electrochemical cell 10 between the at least two discharge current pulses based upon a measured or calculated SOC of the electrochemical cell 10.

After execution of the reforming cycle, the microcontroller 42 may return to operating in the monitoring mode.

The presently disclosed reforming cycle can be executed by the microcontroller 42 on an as-needed basis based upon prior calibration experiments and/or based upon real-time monitoring of various electrical parameters of the electrochemical cell 10. In addition, the presently disclosed reforming cycle can be executed in situ, without having to remove the electrochemical cell 10 (or the overall battery) from service and without the use of external monitoring or control equipment.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method of reforming a negative electrode layer of a secondary lithium battery, the method comprising:
   measuring an electrical parameter associated with a porous sensory layer disposed between a major facing surface of a negative electrode layer and an opposing surface of a positive electrode layer, the porous sensory layer including an electrically conductive material and being electrically isolated from the negative electrode layer and the positive electrode layer;
   evaluating the electrical parameter to determine whether a lithium dendrite is present on the major facing surface of the negative electrode layer that extends continuously from the major facing surface of the negative electrode layer to the porous sensory layer; and
   responsive to a positive determination that the lithium dendrite is present on the major facing surface of the negative electrode layer, executing a reforming cycle that reforms the major facing surface of the negative electrode layer and eliminates at least a portion of the lithium dendrite such that the lithium dendrite does not extend continuously from the major facing surface of the negative electrode layer to the porous sensory layer,
   wherein the reforming cycle is executed by at least one of:
   (i) passing a pulsed electric current between the negative electrode layer and the porous sensory layer and through the lithium dendrite, or
   (ii) applying a voltage pulse across the negative electrode and the porous sensory layer such that electric current flows through the lithium dendrite.

2. The method of claim 1 wherein the electrical parameter is
   an electrical potential difference between the porous sensory layer and the negative electrode layer, and wherein the method further comprises:
   executing the reforming cycle when a measurement of the electrical potential difference between the porous sensory layer and the negative electrode layer is about zero.

3. The method of claim 1 wherein the reforming cycle is executed by
   passing a pulsed electric current between the negative electrode layer and the porous sensory layer and through the lithium dendrite.

4. The method of claim 1 wherein execution of the reforming cycle generates heat within the lithium dendrite.

5. The method of claim 1 wherein the reforming cycle is executed by applying a discharge current to the negative electrode layer that at least partially discharges the electrochemical cell.

6. The method of claim 5 wherein the discharge current applied to the negative electrode layer exhibits a pulsed current profile that includes at least two current pulses separate in time.

7. The method of claim 1 further comprising:
   recording a number of charge and discharge cycles experienced by the electrochemical cell, and
   executing the reforming cycle when the number of charge and discharge cycles experienced by the electrochemical cell is greater than a predetermined number of charge and discharge cycles.

8. The method of claim 1 wherein the negative electrode layer:
   consists essentially of lithium and comprises, by weight, greater than 97% lithium.

9. The method of claim 1 further comprising:
   cycling the electrochemical cell by repeatedly charging and discharging the electrochemical cell by respectively applying a charging current to the positive electrode layer and a first discharge current to the negative electrode layer;
   measuring at least one of:
   (i) a number of charging and discharge cycles of the electrochemical cell, (ii) a measured electrical resistance of the electrochemical cell, or
(iii) a measured electric potential difference between the negative electrode layer and the positive electrode layer; and
executing the reforming cycle when:
(i) the number of charging and discharge cycles is greater than a predetermined number,
(ii) the measured electrical resistance is greater than a predetermined electrical resistance value, or
(iii) the measured electrical potential difference is less than a predetermined electrical potential difference value,
wherein cycling the electrochemical cell forms lithium dendrites or lithium-containing surface irregularities on the major facing surface of the negative electrode layer, and
wherein execution of the reforming cycle eliminates at least a portion of the lithium dendrites or the lithium-containing surface irregularities on the major facing surface of the negative electrode.

10. The method of claim 9 wherein execution of the reforming cycle includes applying a second discharge current to the negative electrode layer to at least partially discharge the electrochemical cell, and wherein the second discharge current is greater than the first discharge current.

11. The method of claim 10 wherein the second discharge current exhibits a pulsed current profile that includes at least two current pulses separate in time.

12. The method of claim 1 wherein the electrical parameter is an electric current flowing through the porous sensory layer, and wherein the method further comprises:
executing the reforming cycle when a measurement of the electric current flowing through the porous sensory layer is greater than zero.

13. The method of claim 1 wherein the reforming cycle is executed by applying a voltage pulse across the negative electrode layer and the porous sensory layer such that electric current flows through the lithium dendrite.

14. The method of claim 1 wherein the negative electrode layer comprises an electrochemically active host material of graphite or silicon.

* * * * *